United States Patent [19]

Righi et al.

[11] 4,100,582
[45] Jul. 11, 1978

[54] AUDIO-VISUAL APPARATUS

[75] Inventors: Nardino Righi, Milan, Italy; Roberto Gavioli, 54, Corso di Porta Vittoria, Milan, Italy, 20100

[73] Assignees: Eurafrica S.R.L. Societa' per Ricerche Elettroniche e Audiovisivi; Roberto Gavioli, both of Milan, Italy

[21] Appl. No.: 745,694

[22] Filed: Nov. 29, 1976

[30] Foreign Application Priority Data

Nov. 28, 1975 [IT] Italy .................. 29780 A/75
May 28, 1976 [IT] Italy .................. 23730 A/76

[51] Int. Cl.² ............... G03B 31/06; G03B 31/04; G11B 15/18
[52] U.S. Cl. .................................. 360/80; 360/3
[58] Field of Search ............... 360/80, 2, 3; 352/27, 352/31, 72; 353/19, 15; 242/199, 71.2, 71.1

[56] References Cited

U.S. PATENT DOCUMENTS

| | | | |
|---|---|---|---|
| 3,389,953 | 6/1968 | Gerry | 353/15 X |
| 3,498,703 | 3/1970 | Gerry | 352/72 X |
| 3,547,529 | 12/1970 | Anthes | 352/72 X |
| 3,592,535 | 7/1971 | Gerry | 353/15 X |
| 3,844,643 | 10/1974 | Aoki | 352/31 X |
| 3,938,194 | 2/1976 | Freudenshuss | 360/80 X |

Primary Examiner—John H. Wolff

[57] ABSTRACT

The audio-visual apparatus comprises a single cassette which contains both the magnetic tape with the audio section recorded thereon and the photographic film with the video section consisting of a series of mono or stereo frames. The payoff spool and the takeup spool of the magnetic tape are coaxial respectively to the payoff spool and to the takeup spool of the photographic film, and there is provided a device for stopping the motion of the photographic film with respect to the motion of the magnetic tape, so as to allow the reproduction of the audio section during the projection of a photographic frame. The audio-visual apparatus comprises also a reproducing device which serves for the reproduction of both the audio and video section and which consists of a drive mechanism for driving into motion the spools of the magnetic tape so as to cause same to be explored by a reproduce head, and the spools of the photographic film so as to cause same to pass along a path on which there is arranged a source of illumination for the projection of the single frames. In the reproducing device there is also provided control element cooperable for actuating the above mentioned stopping device for the photographic film.

3 Claims, 13 Drawing Figures

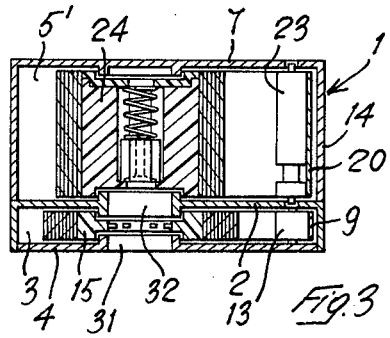
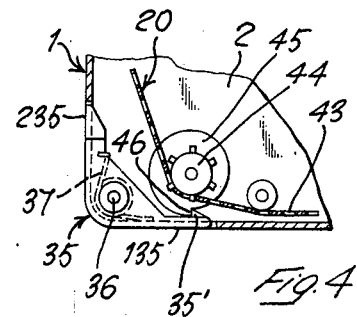
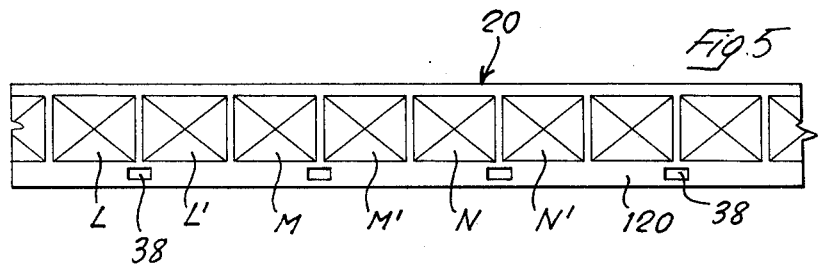
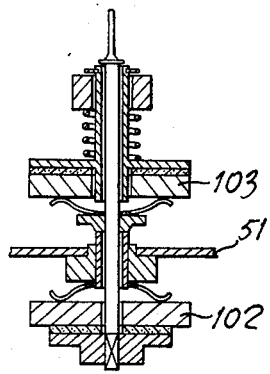
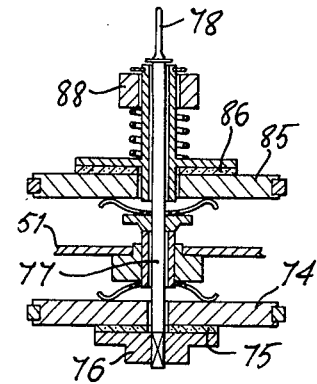

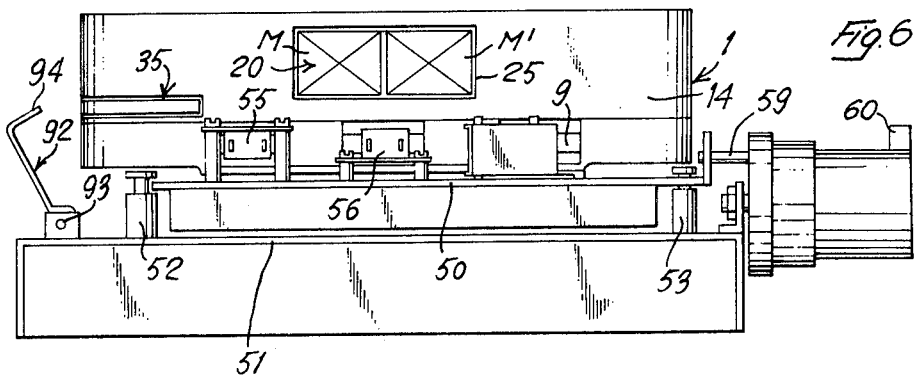
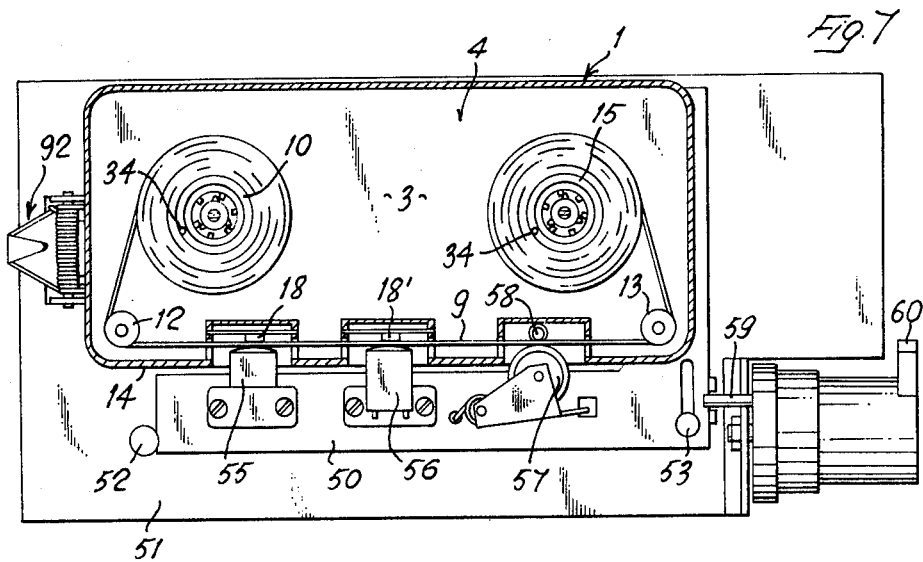
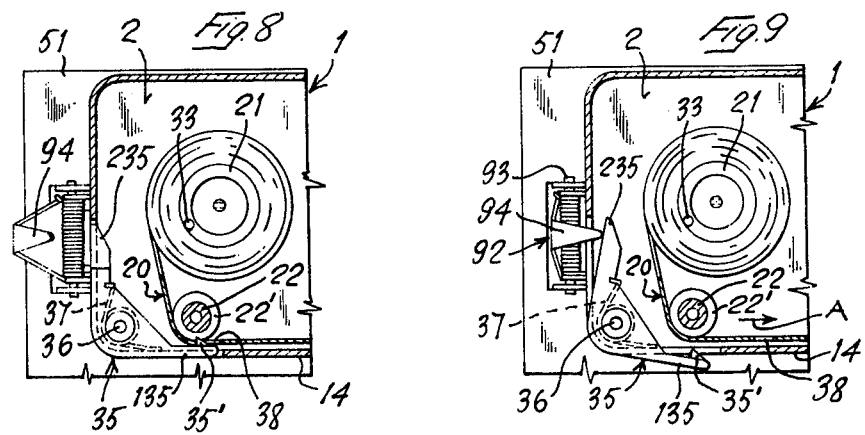

AUDIO-VISUAL APPARATUS

BACKGROUND AND SUMMARY OF THE INVENTION

The present invention relates to an apparatus for audio-visual equipment, comprising a cartridge or cassette which contains a magnetic tape for the audio or sound section and a photographic film for the video section, and a cassette reproducing device which includes means for promoting the advancement in correct time relationship of the magnetic tape and of the photographic film.

In the audio-visual apparatus of known type, the audio section is recorded on a magnetic tape stored in a suitable cassette which is inserted in an audio reproducing device, separately from the photographic film which contains frames (mono or stereo) to be projected by using another device. The separate use of the magnetic tape for the audio section and of the photographic film for the video section involves many problems, such as for instance the problem of having the audio and video sections started and changed in correct time relationship (synchronization of the audio and video), and the problem of storage, for each argument treated, of two separate elements (cassette and photographic film), which may lead to some difficulty whenever it is necessary to select for a particular argument the correct magnetic tape and the correct photographic film.

In the audio-visual apparatus according to the invention, there is provided a single cartridge or cassette which contains both the magnetic tape with the audio section recorded thereon and the photographic film with the appropriate video section, consisting of a series of mono or stereo frames. Preferably the payoff spool and the takeup spool of the magnetic tape are coaxial respectively to the payoff spool and the takeup spool of the photographic film, so that the motion to both the said tape and the said film can be imparted by coaxially arranged driving shafts engaging with their respective ends the said coaxial spools, both for the reproduction and for the rewinding. In the cassette according to the invention there is also provided a stopping device for controlling the motion of the photographic film in such a manner that the said photographic film is maintained stopped, for its projection, during the whole period of time in which there is reproduced the audio section pertaining to the particular frame being projected, and is allowed to move so as to present another frame for projection when the pertaining audio section has terminated, and a particular signal or message has been picked up from the magnetic tape for promoting, through suitable control means, the release of the said photographic film.

According to the invention, there is also provided for a playback or reproducing device, which serves for the reproduction, both for the audio and the video section, of the above mentioned cassette, and which comprises means for holding the said cassette in place, means for driving into motion the spools of the magnetic tape so as to cause same to be explored by a reproduce head, and the spools of the photographic film so as to cause same to pass along a path on which there is arranged a source of illumination for the projection of the single frames, and control means for actuating the above mentioned stopping device for the photographic film provided on the cassette.

The above and other features and advantages of the invention will appear evident from the following description thereof, made with reference to the accompanying drawings.

BRIEF DESCRIPTION OF THE DRAWINGS

FIG. 3 is a section of the cassette on a vertical transversal plane along the axis of the coaxial spools;

FIG. 4 is a detail illustrating a modification of the stopping device provided on the cassette;

FIG. 5 illustrates a type of stereo photographic film to be employed in the audio-visual apparatus;

FIG. 6 is a front elevation of the reproducing device with the cassette inserted;

FIG. 7 is a top view of the reproducing device with the cassette inserted, the cassette being sectioned along a plan in correspondence of the magnetic tape;

FIGS. 8 and 9 illustrate two operative details of the stopping device on the cassette, as actuated by the control means in the reproducing device;

FIGS. 12 and 13 are side sections of the driving shafts respectively of the payoff spools and of the takeup spools.

DESCRIPTION OF THE PREFERRED EMBODIMENT

Figure 1:
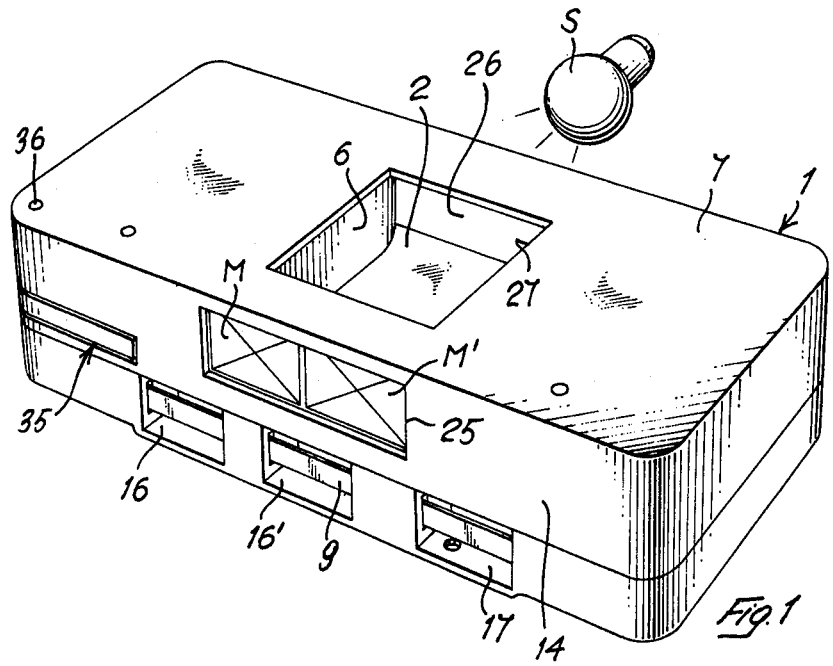
FIG. 1 is a perspective view of the cassette to be employed in the audio-visual apparatus according to the invention.
Figure 2:
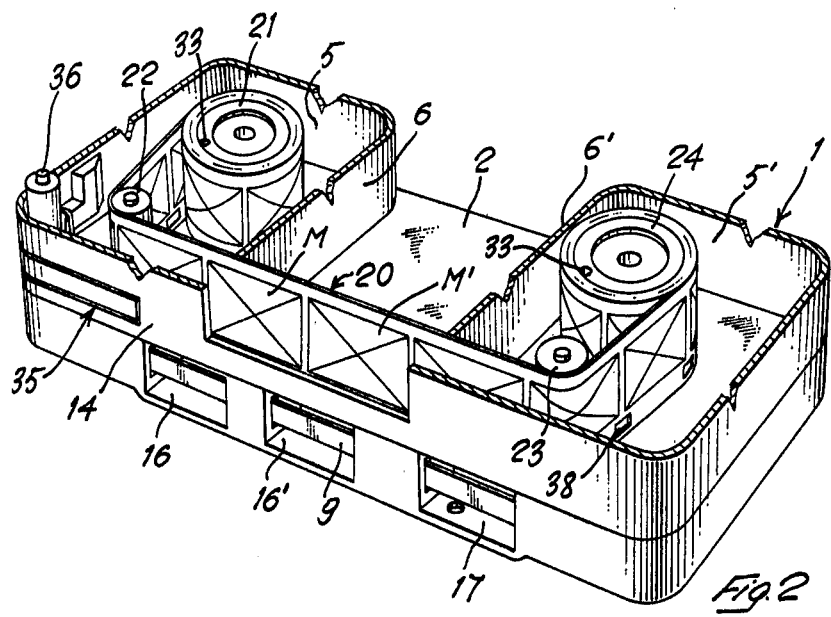
FIG. 2 is a perspective view similar to that of FIG. 1, with parts broken away for seeing the interior of the cassette.

With particular reference to FIGS. 1 to 3 and 7, the cartridge or cassette for audio-visual apparatus comprises a housing 1, preferably made of suitable plastics, and presenting a substantially rectangular parallelepiped shape, longitudinally subdivided by a partition wall 2 which is parallel to the main plane of the cassette. In this manner there is formed a first compartment 3, defined by the partition wall 2 and by the side 4, while two transversal partition walls 6, 6' which are parallel between them and to the smaller faces of the cassette, define, together with the first partition wall 2 and the side 7, two other compartments 5, respectively 5'. The cassette 1 is assembled by means of screws, or in any other known manner. The compartment 3, which is intended to house the magnetic tape for the audio section of the cassette, presents a thickness which is inferior to the thickness of the compartments 5, 5' which are intended to house the photographic film for the visual section of the cassette.

At the interior of compartment 3 there is housed, as above mentioned, the magnetic tape 9 which unwinds from a payoff spool 10, is guided by rollers 12, 13 and by other suitable guide surfaces along a rectilinear length parallel to the longitudinal smaller side 14 of the cassette, and is wound onto a takeup spool 15. On the said longitudinal side 14, extending to adjacent portions of the contiguous side 4, there are provided apertures 16, 16', through which conventional magnetic heads may provide for the recording or the reproducing of the magnetic tape 9. Another aperture 17 is provided in order to permit the insertion of a conventional drive capstan and pressure roller for the movement of the tape. Also conventional felt pads 18, 18', supported by elastic means, are arranged in correspondence of each aperture 16, 16'.

In an analogous manner, in the compartments 5 and 5' there is housed the photographic film 20 which unwinds from a payoff spool 21, is guided by rollers 22 and 23 along a rectilinear section which is parallel to the side 14, and is wound onto a takeup spool 24. The side 14 is provided with an aperture 25, through which the single frames of the photographic film are projected, being illuminated by a beam of light from a source S passing through an aperture 26 provided on the side of the cassette which is opposed to the said side 14, while a further aperture 27 is provided on side 7 of the cassette for permitting the air cooling of the film.

From the above, it will be appreciated that partition walls 6 and 6' provide for the insulation of the photographic film from the heat of the light source.

As it can be appreciated from FIG. 3 the spools 10 (and 15) of the magnetic tape, and the spools 21 (and 24) of the photographic film are mounted co-axial and freely rotatable in the respective compartments of the cassette. Said spools 10 (and 21) and 15 (and 24) can be driven into rotation by suitable co-axial winding spindles which penetrate through openings 31 on side 4 and through openings 32 on partition wall 2.

The ends of the photographic film 20 and of the magnetic tape 9 are secured to the respective spools (see FIG. 2) by means of conventional locking pins 33, 34.

The step-wise advancement of the frames of the photographic film 20 must take place in correct time relationship with the advancement of the magnetic tape 9. To this purpose, there has been provided a stopping or locking device of the advancement of said photographic film 20 (see particularly FIGS. 2, 8 and 9) which consists of a square lever 35, fulcrumed at 36 on the housing 1 and urged by a return spring 37 which acts so as to push a locking tooth 35' of said lever 35 into a suitable perforation or sprocket hole 38 obtained on the longitudinal side of the photographic film in correspondence of each frame.

The locking tooth 35' of lever 35 is located in correspondence of an annular groove 22' provided in the guide roller 22, so as to be able to penetrate inside the perforations 38 of the photographic film 20, and to stop same. The said lever 35 presents suitably shaped portions, in correspondence of the locking tooth 35' provided on one end 135, and in correspondence of the other end 235, in order to permit the smooth advancement of the photographic film during its normal operation (see arrow A, FIGS. 8 and 9) and its rewinding in the contrary direction. The swinging movement of lever 35, for locking and releasing the photographic film, is controlled by suitable means acting on the end of said lever opposed to the end carrying the locking tooth 35', as it will be explained later in the course of the present description.

In the case of the above described embodiment, the photographic film 20 (FIG. 5) must be provided with particular perforations or sprocket holes 38. In case that it is desired to use conventional photographic films presenting the usual disposition of sprocket holes, very near the one to the other, then it is necessary to use the particular locking device illustrated in FIG. 4.

With reference to the above mentioned FIG. 4, the conventional photographic film 20 presenting the perforations 43 is passed on a freely rotatable sprocket wheel 44 presenting a coaxially mounted cam-shaped profile 45 defining a radial step 46 which can be engaged by the locking tooth 35' of the square lever 35. In this latter case, the longitudinal development of the cam profile 45 is equal to the gauge between the subsequent frames in the photographic film 20.

Making now reference to FIGS. 6 to 13, it will now be described the reproducing apparatus for reproducing the information on cassette 1 of the type above disclosed. With particular reference to FIGS. 6 and 7, the reproducing apparatus comprises a support plate 50, which is carried by the base plate 51 and which can be slidably moved towards the front side of cassette 1, through suitable guide members 52, 53 and 54. On said support plate 50 there are mounted a first magnetic head 55, intended to pick up the code informations on one track of the magnetic tape, for promoting the movement of the photographic film, a second magnetic reproduce head 56, intended to pick up the audio section of the cassette, recorded on the second track of the magnetic tape, and a pressure roller 57 lined with rubber which, by cooperating with the drive capstan 58 promotes the movement of the magnetic tape 9. The support plate 50 may be moved, suitably guided by guide members 52, 53, 54, to plate 51 and the cassette, through the action of a pin 59 which acts on a suitably shaped small plate secured to support plate 50, under the action of the manually operated lever 60.

Figure 10:
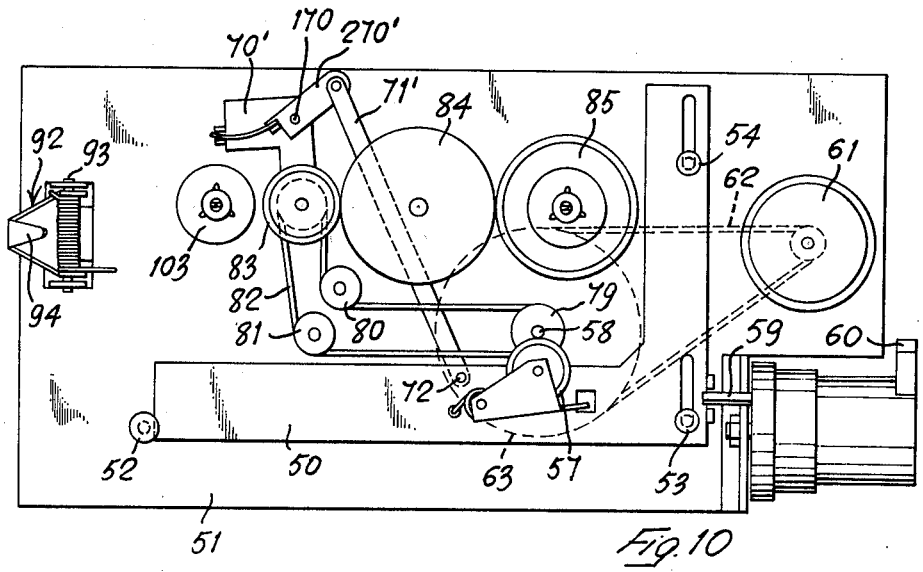
FIG. 10 is a top view of the reproducing device, with the omission of the magnetic reproduce heads.
Figure 11:
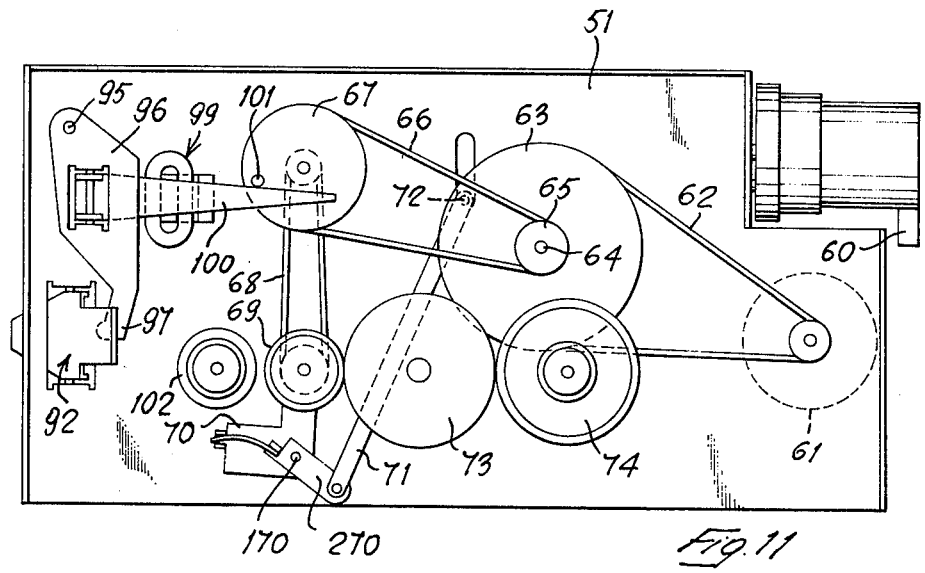
FIG. 11 is a view from the bottom of the reproducing device of FIG. 10.

On the base plate 51 there are mounted the drives and transmissions for obtaining the operation of the apparatus (see particularly FIGS. 10 and 11). On the said plate 51 there are mounted: a constant speed electric motor 61 which, through belt 62 drives into rotation the pulley 63 on the shaft 64 of which there are keyed the small pulley 65 and the drive capstan 58 (see FIG. 10) for entraining into movement, with the cooperation of the pressure roller 57, the magnetic tape 9. The small pulley 65, through belt 66, drives pulley 67 which on its turn through belt 68 drives into rotation the rubber-lined wheel 69 which is carried by the support plate 70 mounted capable of oscillating around pivot pin 170, said support plate 70 being caused to swing around said pin 170 under the action of the elastic end of lever 270, the movement of which is controlled through the tie rod 71, the other end of which is hinged to pin 72 connected through a suitable slot to the support plate 50.

The said rubber-lined wheel 69 drives into rotation the wheel 73, which on its turn drives the other rubber-lined wheel 74 which latter (see particularly FIG. 13) through a felt disc 75 drives into rotation the bushing 76 onto which there is keyed the cylindrical shaft 77 terminating at its upper end with a prismatic male member 78 acting as a driving spindle which is intended to engage the takeup spool 24 of the photographic film. The said felt disc 75, interposed between wheel 74 and bushing 76, presents a very low friction coefficient, so that the stopping of the photographic film does not interfere with the movement of the various drives.

On the same shaft 64, on which there is keyed the drive capstan 58, there is also keyed the pulley 79 (FIG. 10) which, through the idle rollers 80 and 81 and through belt 82, drives the rubber-lined wheel 83 which is carried by the support plate 70' mounted capable of oscillating around pivot pin 170, said support plate being caused to swing around said pin 170 under the action of the elastic end of lever 270', the movement of which is controlled through the tie rod 71', the other end of which is hinged to pin 72 connected to the support plate 50.

The above mentioned rubber-lined wheel 83 drives into rotation the wheel 84 which, on its turn, drives the rubber-lined wheel 85; this latter is coupled, through a friction disc 86 to the driving spindle 88 which is intended to engage and drive into rotation the takeup spool of the magnetic tape.

From the above, it appears that, whenever the support plate 50 is in the conditions as illustrated in FIGS. 6 and 10, the takeup spool 15 of the magnetic tape and the takeup spool 24 of the photographic film are constantly urged into rotation.

In order to avoid the uninterrupted movement of the photographic film 20 through the projection aperture 25 of the cassette 1, the movement of the photographic film is normally interrupted, and it is released at the completion of the audio portion pertaining to the frame being projected, for a period of time which is sufficient to permit the movement of the said photographic film for a length corresponding to the gauge between two subsequent frames (or couple of frames, in the case of stereo diapositives). The control for the releasing of the photographic film is obtained through a message which has been pre-recorded in the magnetic tape.

In the present case, let us assume (FIG. 5) that the photographic film to be projected comprises a series of stereo diapositives, and it consists more particularly of a film 20 provided with a longitudinal edge 120 on which there are obtained perforations 38 centered in correspondence of the line of separation of each pair of frames L-L', M-M', N-N' which are intended for the stereo projection.

Referring particularly now to FIGS. 8 and 9 it appears evident that in order to release the photographic film it is necessary that the locking tooth 35' be disengaged from the perforation 38. This is obtained by causing the oscillation of lever 92 fulcrumed in 93, and terminating with its upper end 94 formed as a point and arranged at right angles with respect to the remaining portion of said lever, from the rest position indicated in FIGS. 6 and 8 to the position indicated in FIG. 9. The consequent operation of the said lever 92 acting on the square lever 35 appears evident simply by looking at the mentioned FIG. 9.

According to a preferred embodiment of the invention (see FIG. 11), the actuating lever 92 is caused to oscillate from its rest position to the position in which it acts on the arm 235 of square lever 35, thus releasing the photographic film, by the rotation of the small plate 96 around the fixed pin 95, said small plate 96 acting with its free end 97 against the lower end of the actuating lever 92. The rotation of plate 96 around pin 95 is obtained by the energization of the electromagnet 99 which draws the movable keeper 100 hinged on plate 96 towards the front face of the wheel 67. In this manner, keeper 100 is subjected to the action of the pin 101 provided on pulley 67 which pushes the said keeper 100, thus promoting the swinging of plate 96 around pin 95, and the consequent oscillation of lever 92.

The device according to the invention is provided with means for the re-winding of the magnetic tape and of the photographic film again onto the respective payoff spools. The rewinding is obtained by acting, through lever 60 and pin 59, so as to promote the shifting of the support plate 50 towards the front section of the apparatus.

In this manner, the tie rods 71, having their ends hinged on said support, cause the movement of the elastic levers 70 and the consequent shifting of the rubber-lined wheels 69 and 83, which transmit the rotation to the wheels 102 and 103 connected, through suitable friction discs 104 and 105 (FIG. 12) respectively to the winding hubs of the payoff spools of the photographic film and of the magnetic tape.

While in the course of the specification it has been said that one track of the magnetic tape carried the audio section, and the other track carried the message or signal for actuating the control means, it appears obvious to any person skilled in the art that both the audio section and the message or signal can be recorded on a single track, provided that use is made of suitable filters to separate the two different informations.

It is believed that the invention will have been clearly understood from the foregoing detailed description of a preferred embodiment of same. Changes in the details of construction may be resorted to without departing from the spirit of the invention, and it is accordingly intended that no limitation be implied and that the hereto annexed claims be given the broadest interpretation to which the employed language fairly admits.

We claim:

1. A cartridge for a still image sound-synchronized audio-visual apparatus comprising:
   (a) a parallelepiped housing having opposed flat parallel faces, a partition wall intermediate and substantially parallel to said opposed faces dividing said housing into first and second compartments, one of said compartments having positioned therein a payoff spool and a takeup spool for a magnetic tape, said one compartment being apertured to permit the insertion thereinto of at least one magnetic reproduction head and a magnetic tape drive capstan, the other of said compartments having positioned therein a payoff spool and a takeup spool for a photographic film, said other compartment being apertured to permit projection of the images on the photographic film, the payoff and the takeup spools of the respective compartments being coaxially mounted and independently rotatable;
   (b) a magnetic tape having sound information thereon wound upon the payoff and takeup spools of said one compartment;
   (c) a photographic film having a plurality of frames with visual information thereon wound upon the payoff and takeup spools of said other compartment, and a series of spaced perforations provided along the length of said film; and
   (d) means for controlling the movement of said film comprising a lever fulcrummed on said housing having the pivotal axis thereof parallel to the rotational axes of said spools, one end of said lever having means thereon cooperable with a perforation on one of said film frames for selectively arresting the movement thereof, said lever being pivotable by a force applied to the other end thereof so as to pivot between a first position in which said means on said one end of the lever is out of engagement with said film perforation to permit movement thereof and a second position in which said means on said one end of the lever engages with the film perforation to prevent movement thereof, spring means being provided for normally biasing said lever into said second position.

2. A cartridge according to claim 1, wherein said means on said one end of the lever comprises a toothlike projection configured and dimensioned to matingly engage with the perforations of said film.

3. A cartridge according to claim 1 in combination with a playback and/or reproducing device, said device including a drive spindle engageable drivably with the takeup spool for the photographic film, drive means concentric to said drive spindle engageable to uninterruptedly drive the takeup spool of the magnetic tape, at least one electric motor drivably connected to said drive spindle and concentric drive means and low-friction coupling means interposed operatively between said drive spindle and said motor means for drivably coupling said drive spindle and motor means, the coefficient of friction of said low-friction coupling means being selected so as not to interfere with the driving of the drive spindle during such times as the film is prevented from movement by said film control means.

* * * * *